Figure 1:
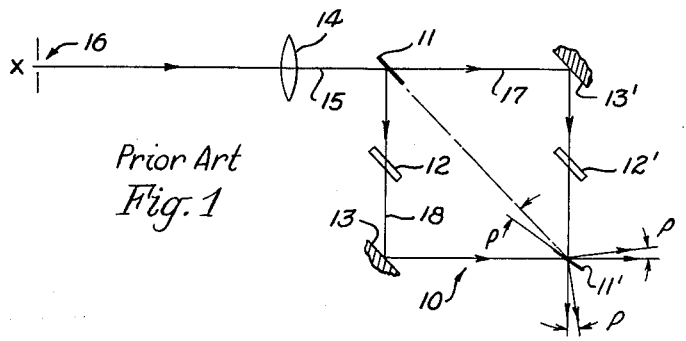

Nov. 23, 1965    J. B. SAUNDERS    3,218,916
WAVE FRONT SHEARING INTERFEROMETER
Filed Aug. 23, 1962    2 Sheets-Sheet 1

INVENTOR
James B. Saunders
BY
David Robbins   ATTORNEY
Alvin J. Englert   AGENT

Nov. 23, 1965  J. B. SAUNDERS  3,218,916
WAVE FRONT SHEARING INTERFEROMETER
Filed Aug. 23, 1962  2 Sheets-Sheet 2

INVENTOR
James B. Saunders
BY
David Robbins  ATTORNEY
Alvin J. Englert  AGENT

*United States Patent Office*

3,218,916
Patented Nov. 23, 1965

3,218,916
WAVE FRONT SHEARING INTERFEROMETER
James B. Saunders, Alexandria, Va., assignor to the United States of America as represented by the Secretary of Commerce
Filed Aug. 23, 1962, Ser. No. 219,089
11 Claims. (Cl. 88—14)

This invention relates to a wave front shearing interferometer and more particularly to a wave front shearing interferometer that is cheaper, easier to construct and use, and less subject to adverse conditions of vibration and temperature than prior devices of like function.

During the construction of high quality lenses and mirrors, and the testing of combinations of the same, it is frequently necessary that the aberrations that are present therein be measured, so that corrective steps can be taken. The measurements usually are accomplished interferometrically by combining the wave front produced by the optical system under test with a second wave front. This second wave front may be a plane wave front produced by a flat reference surface, whereby a set of interference fringes known as a "contour map" is obtained, from which the aberrations may be evaluated in a well-known manner. In the wave front shearing interferometer, however, the two wave fronts are obtained by dividing a beam from the optical system into two components, and shearing the wave front of one component relative to the wave front of the other. The wave front shearing interferometer thus eliminates the need for an expensive, delicate optical reference surface.

The wave front shearing interferometers of known construction have not been used extensively, however, because they are expensive and difficult to use. In general, they comprise two beam dividers, two mirrors, and two compensating plates, each of which is adjustably mounted on a flat plate. Such interferometers are sensitive to temperature and vibrations and require critical, periodic adjustments.

In accordance with the present invention, the beam dividers and mirrors of the prior art are incorporated into two prisms to avoid temperature and vibration effects. Each prism has an entrance, a common, a reflecting, and an exit face. The common faces of the prisms are disposed adjacent each other and enclose a semireflecting film between them. The prisms are so arranged that a converging beam from the optical system to be tested enters one of the entrance faces and is divided at the semireflecting film into transmitted and reflected components. These components are reflected by the two reflecting faces back to the semireflecting film at a second region different from the region where the original beam was divided. At this second region each of the components divides and combines with a part of the other, thus producing two outputs. The prisms are so aranged that wave fronts of the beams combined in each output are sheared relative to each other. By such construction, a small, rugged wave front shearing interferometer is easily, economically provided.

It is an object of the present invention to provide a wave front shearing interferometer which is rugged, compact, economical, and simple to use.

Another object is to provide a wave front shearing interferometer in which all the component beam dividers and mirrors are contained within a pair of prisms.

Another object is to provide a wave front shearing interferometer which is not affected by adverse conditions of temperature and vibration.

Figure 1A:
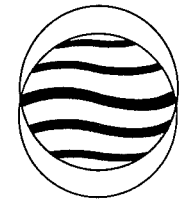
Figure 2:
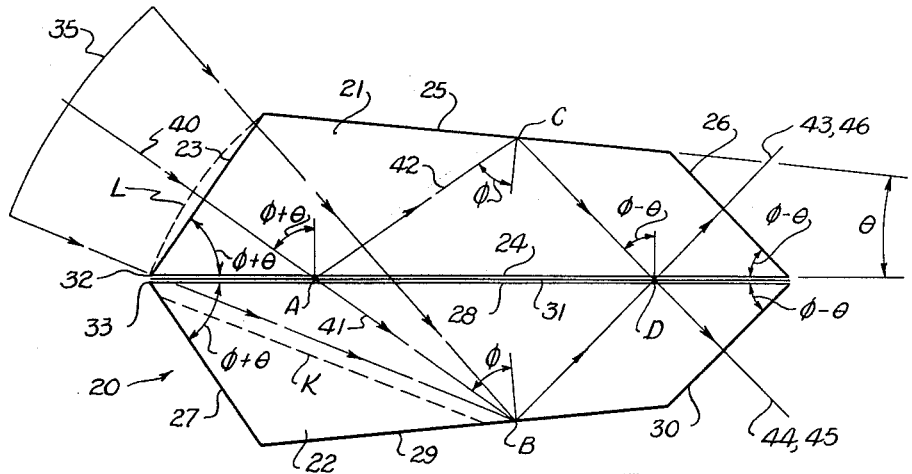
Figure 3:
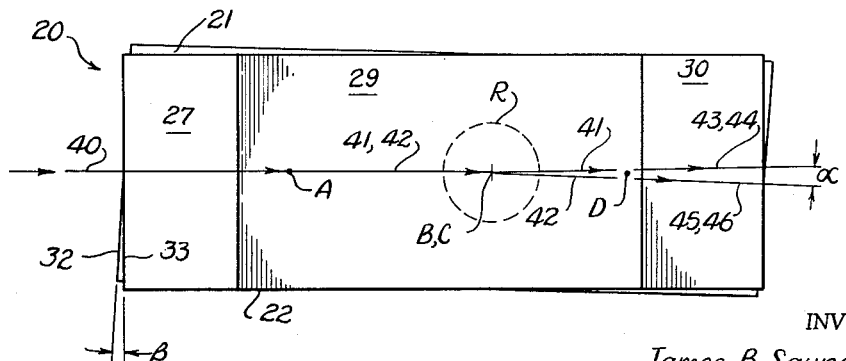
Figure 4:
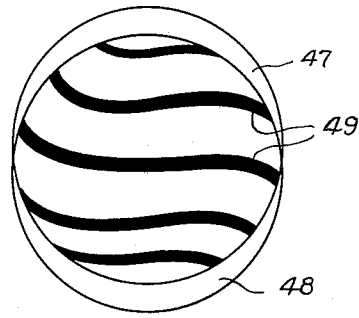
Figure 7:
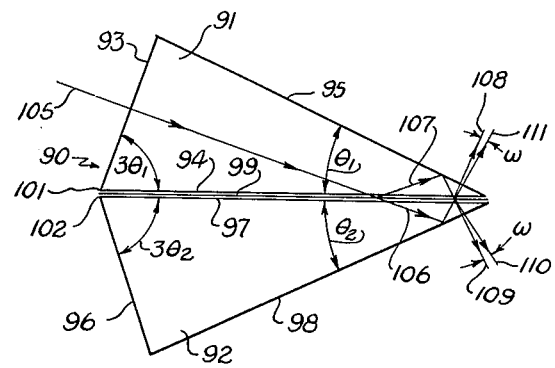
Figure 5:
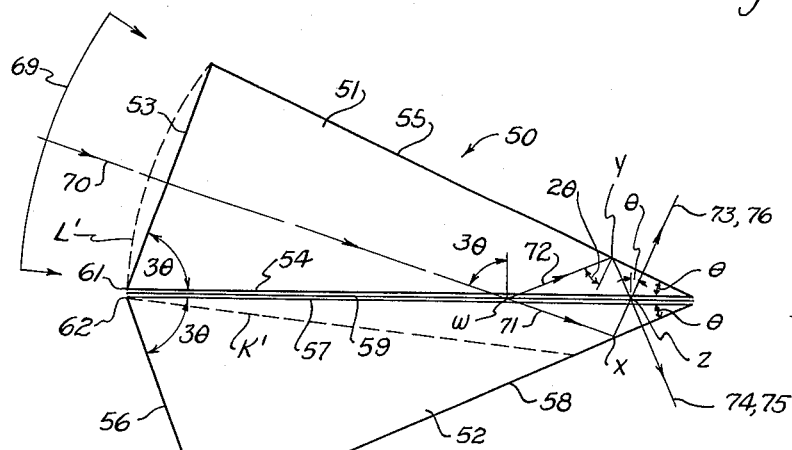
Figure 6:
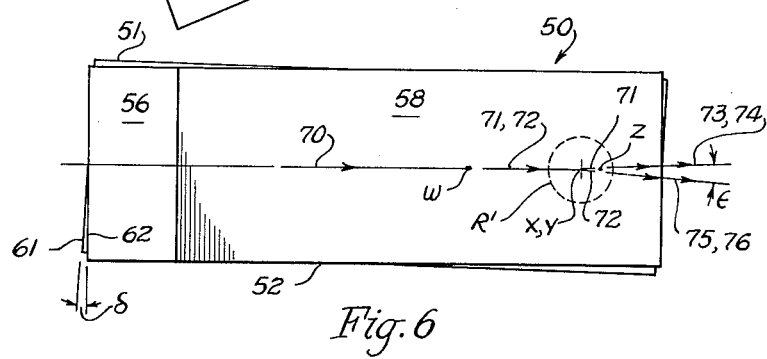

Other objects and many of the attendant advantages of this invention will be readily appreciated as the same becomes better understood by reference to the following detailed description when considered in connection with the accompanying drawings, in which like reference numerals designate like parts throughout the figures thereof, and wherein:

FIG. 1 is a diagrammatic view of a prior art wave front shearing interferometer;
FIG. 1a shows the field of view of the interferometer of FIG. 1;
FIG. 2 is a semidiagrammatic top plan view of an interferometer embodying the present invention;
FIG. 3 is a front elevational view of the interferometer shown in FIG. 2;
FIG. 4 shows the field of view of the interferometer of FIGS. 2 and 3;
FIG. 5 is a semidiagrammatic top plan view of another interferometer embodying the present invention;
FIG. 6 is a front elevational view of the interferometer shown in FIG. 5; and
FIG. 7 is a semidagrammatic top plan view of a further embodiment of the present invention.

The prior art wave front shearing interferometer 10, shown in FIG. 1, includes two beam dividers 11, 11', two compensating plates 12, 12', and two mirrors 13, 13'. A lens 14, which is to be tested, is arranged to form an image of a small source 16 on or near the second beam divider 11'. The principal ray 15 of the converging beam produced by the lens 14 accordingly is incident on the first beam divider 11. The component 17 transmitted by this beam divider 11 is reflected by mirror 13' to the second beam divider 11', and the reflected component 18 is reflected by the mirror 13 to the second beam divider 11'. By positioning the second beam divider 11' at a small angle $\rho$ relative to the first beam divider 11, the components 17, 18 combine in the second beam divider 11' in such a manner that the wave fronts of the combined portions are sheared relative to each other. Consequently, the overlapping area of the two wave fronts contains interference fringes, as illustrated in FIG. 1a. This fringe pattern can be used to determine the absolute shape of the wave front produced by the lens. Reference may especially be had to the method described by the present applicant in the Journal of Research of the National Bureau of Standards, vol. 65B, No. 4, pp. 239–244, 1961.

In accordance with the present invention, the elements of the prior art interferometer 10 shown in FIG. 1 are combined into two prisms having a semireflecting film between them. The ends of the semi-reflecting film correspond to the two beam dividers 11, 11', and the shear is obtained by appropriately orienting the prism faces that correspond to the mirrors 13, 13', as will be explained hereinafter.

The interferometer 20, shown in FIGS. 2 and 3, is an exemplary embodiment of the present invention and includes two identical quadrilateral prisms 21, 22. The prism 21 has an entrance face 23, a common face 24, a reflecting face 25, and an exit face 26. Prism 22 has corresponding faces 27–30, common face 28 of which is disposed adjacent common face 24 of prism 21. Enclosed between these common faces is a semireflecting film 31 of aluminum, silver, or the like. This semireflecting film 31 conveniently is deposited in the conventional manner on one of the common faces 24, 28, after which the two faces are cemented together with a suitable optical cement.

In each of the prisms, the entrance face forms a dihedral angle $(\phi+\theta)$ with respect to the common face. In addition, the reflecting face forms a dihedral angle $\theta$ with respect to the common face; and the exit face forms a dihedral angle $(\phi-\theta)$ with respect to the common face. The vertex line of the dihedral angle $\theta$ is closer to the vertex line of the dihedral angle $(\phi-\theta)$ than to the vertex line of the dihedral angle $(\phi+\theta)$. It can easily be shown that the provision of these angles in each of the prisms causes a ray that enters either entrance face, centered and normal with respect thereto, to be incident on the associated common face at the angle $(\phi+\theta)$. If the ray is reflected from the common face, it will be incident on the associated reflecting face at the angle $\phi$, and if reflected, will be again incident on the common face, this time at the angle $(\phi-\theta)$. If the ray is reflected from this point, it will exit through the associated exit face normal with respect thereto. The ray will exit through the center of the exit face, provided the exit face is appropriately spaced from the entrance face. This spacing will readily be effected by those skilled in the art. The manner in which the above-described properties of each prism are utilized in the interferometer 20 will be explained hereinafter.

As shown in FIG. 3, the prisms 21, 22 are angularly displaced relative to each other about an axis perpendicular to and centered on the adjoined common faces 24, 28, so that the corresponding vertex lines, such as the vertex lines 32, 33 of the dihedral angles $(\phi+\theta)$ of each of the prisms 21, 22, intersects and enclose a small angle $\beta$. This angular displacement $\beta$ is conveniently obtained by rotating the prisms relative to each other during the above-mentioned cementing of the common faces. It will be appreciated that this angle $\beta$ causes the reflecting faces 25, 29 to be asymmetrical or oppositely inclined with respect to the semireflecting film 31, FIG. 2. This effect is used to introduce the shear, as will be explained hereinafter.

As shown in FIG. 2, the interferometer 20 is arranged with respect to a converging wave front 35, produced by an image-forming optical system (not shown) that is being tested, so that the principal ray 40 associated with the wave front 35 enters the entrance face substantially centered and normal. The ray 40 actually lies in the horizontal dividing plane of the oppositely-rotated prisms 21, 22, as shown in FIG. 3, and hence is not exactly perpendicular to the entrance face 23. Ignoring the effect introduced at this entrance face by the small angle of rotation $\beta$, it will be seen that the geometry of the prism 21 is, as previously mentioned, such that the ray 40 is incident on the semireflecting film 31 (point A) at the angle of incidence $(\phi+\theta)$. The ray 40 accordingly is divided into a transmitted component 41 and a reflected component 42.

The components 41, 42 are incident on the reflecting faces 29, 25 (points B and C), respectively, where the angles of incidence are each equal to $\phi$, except for a small error due to the angle $\beta$. Although the magnitudes of the angles of incidence at points B and C are not substantially affected by the angle $\beta$, their directions are. As shown in FIG. 3, the component 41 upon reflection is deviated upwardly from the horizontal dividing plane of the prisms 21, 22, while the component 42 upon reflection is deviated downwardly therefrom. This effect is produced by the aforementioned inclinations of reflecting faces 25, 29, with respect to the semireflecting film 31.

To cause the components 41, 42 to suffer suitable reflection at the reflecting faces 29, 25, the angle $\phi$ may be selected to be equal to or greater than the critical angle $\phi_c$ for the glass or other optical material from which the prisms 21, 22 are formed, in which case the components suffer total internal reflection. The manner in which the angle $\phi$ may be so selected will be explained hereinafter. Nonetheless, if the angle $\phi$ is less than the critical angle $\phi_c$, the area immediately surrounding the points B, C of reflecting faces 29, 25 may be coated with a film of a suitable material of high reflectivity. The dotted line R, FIG. 3, illustrates such a coating applied to reflecting face 29.

Returning to the paths taken by the components 41, 42 shown in FIGS. 2 and 3, it will be seen that these components after reflection at points B and C are incident on the semireflecting film 31 (point D). The magnitudes of the angles of incidence again may be calculated by ignoring the small effect introduced by the angle of rotation $\beta$, and are found to be $(\phi-\theta)$. Because the exit faces 26, 30 form angles of the same magnitude $(\phi-\theta)$ with respect to the common faces (which enclose the semireflecting film 31), the components that emerge from the interferometer are each substantially normal to such exit faces. The components are caused to be centered with respect to the associated exit faces by appropriately spacing the exit faces from the entrance faces.

The components that emerge from the prism total four in number, inasmuch as the aforementioned component 41 divides at the point D into transmitted and reflected components 43, 44, respectively, while the component 42 divides into transmitted and reflected components 45, 46, respectively. As shown in FIG. 2, the components 43, 46 exit as a pair through exit face 26, and the pair 44, 45 exit through face 30. The components comprising each pair are sheared relative to each other, as shown in FIG. 3, wherein the components 43, 46 that exit as a pair are deviated by the angle $\alpha$. The components 44, 45 are similarly sheared. The shear angle is, of course, due to the aforementioned deviations introduced at the points B and C. The shear angle $\alpha$ can be shown to be given by the expression $$\tan \alpha = 4 \tan \phi \sin \tfrac{1}{2}\beta \tag{1}$$

As previously mentioned, the prior art interferometer 10 of FIG. 1 is positioned so that the image of the source 16 produced by the lens 14 falls on or near the second beam divider 11'. Because the beam received by the interferometer is split and recombined, two images fall on the second beam divider, whereby the images may be displaced, to produce interference, by rotating that second beam divider. In the present interferometer 20, the images must be arranged to fall on or near the reflecting faces 25, 29 (the points B and C) since it is as these points that the deviations are introduced into the paths traversed by the components 41, 42 of the incident beam. The interferometer 20, FIG. 2, accordingly is positioned so that the center of curvature of the incident wave front 35 lies near the point B on the reflecting face 29. In this manner, the images formed near B and C are displaced, and an observer looking into either exit face sees two displaced images of the aperture of the optical system producing the converging wave front 35. The overlapping area of the observed images contains a single broad fringe when the aforementioned center of curvature lies on point B. As the center of curvature is moved in the direction of the principal ray 40 from such position, the fringes decrease in width, enabling one to select a convenient width for performing measurements.

FIG. 4 illustrates a typical field of view of an interferometer constructed in accordance with the principles of the present invention. The wave front incident on the interferometer was produced by a simple lens having, inter alia, moderate amounts of spherical aberration. The two displaced images 47, 48 of the lens have a set of fringes 49 that fill the overlapping areas of the images. As set forth in the aforementioned publication, measurements from this set of fringes, plus a direct measurement of the object distance of the lens enable one to calculate all of the aberrations of the lens.

As mentioned above, the wave front 35, FIG. 2, is incident on the plane entrance face 23 of prism 21. To reduce the refraction there to small angles, a planoconvex lens, such as indicated by the dotted line L, whose center of curvature is at the point B, may be cemented to the entrance face. Of course, the entrance face 23 could be ground and polished to provide the same spherical surface. In this connection, it is intended that the term "entrance face of a prism" include those embodiments wherein said face is made spherical as described. In similar manner, the exit faces 26, 30 may be provided with suitable spherical surfaces if desired.

As will readily be appreciated, not all of the prism 22, FIG. 2, receives the incident light. Specifically, the portion of prism 22 that is below the dotted line K does not receive the incident light, and consequently may be removed to reduce the dimensions of the interferometer.

Turning again to the dihedral angles $\theta$, $(\phi+\theta)$ and $(\phi-\theta)$ that define each of the prisms 21, 22 of FIGS. 2 and 3, it will readily be appreciated that the dihedral angle $(\phi+\theta)$ between each entrance face (23, 27) and its associated common face (24, 28) must be less than 90° if the principal ray 40 entering said face in normal and centered fashion is to be incident on the common face. Thus, we may write $$\phi+\theta<90° \quad (2)$$

Each exit face (26, 30), through which a pair of components (43, 36 and 44, 45) exits in normal and centered fashion (except for the small angle of shear $\alpha$), forms the dihedral angle $(\phi-\theta)$ with respect to its associated common face (24, 28). It will be evident that this angle must be equal to or greater than the dihedral angle $\theta$, if the prism is to have no angle greater than 180°, so that the prism may be constructed in simple, rather than compound, form. Hence we may write $$\phi-\theta \geq \theta \quad (3)$$

Combining expressions (2) and (3) yields $$2\theta \leq \phi < 90° - \theta \quad (4)$$

Expression (4) defines the range of values for $\phi$, in terms of $\theta$, that are permissible for the constraints that the principal rays of the entering and exiting beams be normal and centered with respect to the entrance and exit faces, respectively, and that the prism have no angle greater than 180°.

To determine the permissible values of $\theta$, which is the dihedral angle between the reflecting and common faces, expression (4) may be written as $$2\theta < 90° - \theta \quad (5)$$

or $$\theta < 30° \quad (6)$$

Thus, the dihedral angle $\theta$ between the reflecting and common faces must be chosen as less than 30°, after which the angles $(\phi+\theta)$ and $(\phi-\theta)$, that define the entrance and exit faces, respectively, with respect to the common face, may be determined by selecting the angle $\phi$ within the range permitted by expression (4).

In expression (4), the case $\phi=2\theta$ is a special case wherein the dihedral angle $(\phi-\theta)$ between the reflecting and common faces reduces to $\theta$, which is the angle between the exit and common faces. The reflecting and exit faces thus become coplanar, and the prisms assume triangular configurations, as shown in FIGS. 5 and 6.

The interferometer 50 of FIGS. 5 and 6 consists of two identical triangular prisms 51, 52. Prism 51 has an entrance face 53, a common face 54, and reflecting-exit face 55, while prism 52 has corresponding faces 56–58. As in the interferometer 20 described previously, the common faces 54, 57 enclose a semireflecting film 59 between them. With respect to the common face of each prism, the associated entrance face forms the dihedral angle $3\theta$, while the associated reflecting-exit face forms the dihedral angle $\theta$.

As shown in FIG. 6, the prisms 51, 52 are angularly displaced by the angle $\delta$, as measured about an axis centered on and normal to the adjoined common faces 54, 57, whereby the vertex lines 61, 62 mutually intersect and enclose the angle $\delta$.

Ignoring the effect that the small angle of rotation $\delta$ has on the angles of incidence, it will be seen that the geometry of the prisms is such that the ray 70, which is centered and normal with respect to the entrance face 53, is incident on the semireflecting film 59 (point W) at an angle of incidence $3\theta$. The ray 70 divides into the components 71, 72 which are incident (points X, Y) on the reflecting-exit faces 58, 55, respectively. The angles of incidence at points X, Y are each (substantially) equal to $2\theta$. Consequently, the components 71, 72 are both reflected towards point Z of the semireflecting film 59, where each is incident at an angle of incidence $\theta$. The component 71 divides into two components 73, 74, and the component 72 divides into two components 75, 76. Each of these components 73–76 exit substantially perpendicularly through its associated reflecting-exit face 55, 58.

Because of the angular displacement $\delta$, the components 73, 76 that exit through face 55, FIG. 5, are sheared by the angle $\epsilon$, as seen in FIG. 6. The components 74, 75 are, of course, similarly sheared. The shear angle $\epsilon$ is given by the expression $$\tan \epsilon = 4 \tan \theta \sin \tfrac{1}{2}\delta \quad (7)$$

In operation, the interferometer 50 of FIGS. 5, 6 is arranged with the converging wave front 69 of an image-forming optical system (not shown) so that the principal ray 70 thereof is centered and substantially normal with respect to entrance face 53. The interferometer 50 and lens system are spaced to position the center of curvature of the wave front 69 slightly in front of, or behind, the point X. An observer placing his eye to receive the emergent beams associated with the components 73, 76 (or 74, 75) sees two displaced images of the aperture of the optical system, due to the angular displacement of the prisms. The overlapping area (see FIG. 4) of the images is filled with interference fringes. The fringe width is easily adjusted by changing the spacing between the optical system and interferometer.

The triangular prisms 51, 52 of FIGS. 5 and 6 are defined by the two angles $\theta$ and $3\theta$. As previously developed (expression (6) above), $\theta$ must be less than 30° if the principal rays of the entering and exit beams are to be normal to their associated faces. To have the principal ray 70, FIG. 5, centered with respect to entrance face 53, it is evident that the angle of inclination of this ray with respect to the semireflecting film 59, must be equal to or greater than the bisector of the angle $\theta$. That is $$90° - 3\theta \geq \tfrac{1}{2}\theta$$

or $$\theta \leq 25\tfrac{5}{7}° \quad (8)$$

It will be observed that the components 71, 72 of FIGS. 5 and 6 are incident on the reflecting-exit faces 51, 52 at the angle of incidence $2\theta$. Since it is desirable that the components 71, 72 suffer total internal reflection, this angle of incidence conveniently may be selected as equal to or greater than the critical angle of incidence of the glass or other optical material from which the prisms 51, 52 are formed. Hence we may write $$2\theta \geq \phi_c$$

or $$\theta = \tfrac{1}{2}\phi_c \quad (9)$$

where $\phi_c$ is said critical angle. Combining expressions (8) and (9) yields $$\tfrac{1}{2}\phi_c \leq \theta \leq 25\tfrac{5}{7}° \quad (10)$$

Expression (10) gives the permissible range of values of $\theta$ for the constraints that the principal rays of the received and transmitted beams be normal to their associated faces, that the received beam be centered on the entrance face, and that the reflecting-exit faces (55, 58) comprise totally-reflecting surfaces for the principal rays resulting from the first division of the received beam. For most glasses, expression (10) reduces to give the range 23°–25° for $\theta$. In general, it is preferable to use the larger angles, to have $\theta$ (see expression (9) above greater than $\tfrac{1}{2}\phi_c$, whereby those rays in the incident cone of light whose angles of incidence are less than the angle of incidence of the principal ray (71, 72) also suffer total reflection. Otherwise, the ends of the fringe on one side of the set tend to fade out. As described in connection with the interferometer 20, the reflecting-exit faces 55, 58 may be coated in the neighborhood of the points X, Y with highly-reflective materials, to avoid any loss of the incident beam at said points X, Y. The dotted line R', FIG. 6, illustrates such a coating applied to the reflecting-exit face 58.

The dotted lines L' and K', FIG. 5, illustrate modifications of the interferometer 50 that correspond to the modifications described in connection with the dotted lines L and K of FIG. 2. Reference may therefore be had to the above descriptions for an explanation of such dotted lines L' and K'.

In the interferometer 50, FIGS. 5 and 6, the reflecting-exit faces 55, 58 each form the dihedral angle $\theta$ with respect to their associated common faces 54, 57; and the prisms 51, 52 are rotated so that such reflecting-exit faces are oppositely inclined with respect to the semireflecting film 59 enclosed between said common faces, whereby the shearing action is obtained. It will readily be appreciated that it is also possible to cause the reflecting-exit faces to be unequally-inclined with respect to the semireflecting film by making the dihedral angles between each reflecting-exit face and the associated common face different in each prism. The interferometer 90 shown in FIG. 7 illustrates such manner of obtaining shear.

The prism 91, FIG. 7, has a common face 94, with which the associated entrance face 93 forms the dihedral angle $3\theta_1$; and the associated reflecting-exit face 95 forms the dihedral angle $\theta_1$. Similarly, the prism 92 has a common face 97, with which the associated entrance face 96 forms a dihedral angle $3\theta_2$; and the associated reflecting-exit face 98 forms a dihedral angle $\theta_2$. The angles $\theta_1$ and $\theta_2$ are only slightly different in magnitude whereby the prisms are approximately identical. Accordingly, the common faces may be disposed adjacent each other and enclose a semireflecting film 99 as described with respect to the interferometers 20 and 50. The vertex lines 101 and 102 of the dihedral angles $3\theta_1$ and $3\theta_2$ are coincident, although they may assume different relationships, as will be explained hereinafter.

The ray 105 enters entrance face 93 normal and centered with respect thereto, and is incident on the semireflecting film 99 at the angle of incidence $3\theta_1$. It divides into a transmitted component 106 which is incident on the reflecting-exit face 98 at the angle of incidence $(3\theta_1-\theta_2)$, and into a reflected component 107 which is incident on the reflecting-exit face 95 at the angle of incidence $2\theta_1$. These components are reflected to the semireflecting film 99, where the angles of incidence of components 106 and 107 are $(3\theta_1-\theta_2)$ and $\theta_1$, respectively. Component 106 divides into transmitted and reflected components 108 and 109, respectively, and component 107 similarly divides into transmitted and reflected components 110, 111, respectively, of which the components 108, 111 exit as a pair through reflecting-exit face 95, while the components 109, 110 exit as a pair through reflecting-exit face 98. The components of each of these pairs are sheared by the angle $\omega$ which is equal in magnitude to $(2\theta_1-\theta_2)$.

The operation of interferometer 90 is similar to the operation of the interferometer 50, described previously, and hence requires no further elaboration. Also, as discussed in connection with the interferometer 50, either entrance face of the interferometer 90 may be modified to provide a spherical profile; the entrance portion of the other prism may be removed to reduce the dimensions of the interferometer; and the reflecting-exit faces may be provided with reflective coatings of appropriate dimensions to reflect those portions of the beams associated with rays 106, 107 that do not suffer total internal reflection.

It will readily be appreciated that the direction of shear in the interferometer 90 is in the plane of FIG. 7, whereas the direction of shear in the interferometer 50 of FIG. 5 is in the plane normal to the plane of FIG. 5. As previously mentioned, the shear in the interferometer 90, FIG. 7, is obtained without any angular displacement of the prisms 91, 92 relative to each other. It is, of course, possible to angularly displace the prisms 91, 92 and get a component of shear in the direction normal to the shear illustrated (the plane of the angles $\omega$). If the interferometer 90 is arranged to shear in orthogonal directions, it is found that the fringes in the field of view do not reduce to a single broad fringe as the spacing between the interferometer and optical system is varied. Rather, the fringe pattern simply rotates 180° as the center of curvature of the incident beam (image of the source) is moved from a position in front of the reflecting-exit face 58 (FIG. 7) to a position therebehind. Thus it is possible, in such a construction, to align the fringes in the direction of the sheared images, which alignment may be found to be more convenient for performing measurements on the fringes.

To obtain the above-described fringe alignment effect, the interferometer 20, FIGS. 2 and 3, also may be constructed from prisms having unequal angles where the equal angles $\theta$ are shown.

Various changes and modifications of the above-described embodiments of the present invention will be obvious to those skilled in the art, and may be utilized without departing from the scope and spirit of the invention. For example, the prism pairs may be clamped together with a film of oil between them, as an alternative to cementing. Also as an example, the semireflecting films may be applied to the common faces by coating opposite halves of each prism, to improve the compensation for the optical path differences between the prisms and cement or other medium therebetween. It is therefore intended that the invention be limited only as defined in the appended claims.

What is claimed is:

1. A wave front shearing interferometer comprising:
    a pair of prisms,
    each prism having an entrance face,
        a common face, a reflecting face, and an exit face,
    the common face of each prism forming first, second and third dihedral angles with the reflecting, entrance and exit faces, respectively, of said prism,
    the vertex line of said first dihedral angle being closer to the vertex line of said third dihedral angle than to the vertex line of said second dihedral angle, in each of said prisms,
    a semireflecting film,
    said prisms being disposed adjacent each other with said semireflecting film enclosed between said common faces,
    the apices of the first dihedral angles of said adjacent prisms pointing in the same direction,
    said first, second and third dihedral angles being selected so that a ray of light entering one of said entrance faces is divided at a first region of said semi-reflecting film into transmitted and reflected components which are reflected by said reflecting faces back to said semireflecting film at a second region thereof which is different from said first region, each of said components dividing at said second region into further components that exit in pairs through said exit faces,
    the reflecting faces of said prisms each being inclined with respect to said semireflecting film so as to cause the wave fronts associated with each pair of exiting components to be sheared relative to each other.

2. An interferometer as set forth in claim 1, wherein said reflecting and exit faces of each prism are coplanar.

3. An interferometer as set forth in claim 1, wherein said first, second and third dihedral angles are acute.

4. An interferometer as set forth in claim 3, wherein said first, second and third dihedral angles are substantially equal to $\theta$, $(\phi+\theta)$, and $(\phi-\theta)$, respectively, where $\theta$ is less than 30°, and $\phi$ is equal to or greater than $2\theta$ but less than 90°−$\theta$.

5. An interferometer as set forth in claim 3, wherein the entrance face of one of said prisms is provided with a spherical surface, the center of curvature of said spherical surface being located substantially at the intersection of the normal centered on said entrance face and the reflecting face of the other of said prisms.

6. An interferometer as set forth in claim 4, wherein said inclination of said reflecting faces of said prisms about said semireflecting film to cause wave front shearing is provided by having said prisms angularly displaced relative to each other about an axis perpendicular to and centered on said adjacent common faces so that the vertex lines of said second dihedral angles intersect and enclose a small angle.

7. An interferometer as set forth in claim 4, wherein said inclination of said reflecting faces of said prisms about said semireflecting film to cause wave front shearing is provided by having said first dihedral angles of said prisms slightly different from each other.

8. An interferometer as set forth in claim 2, wherein said first and third dihedral angles of said prisms are each equal to $\theta$, where $\theta$ is less than 30°,
said second dihedral angles of said prisms each being equal to $3\theta$,
said inclination of said reflecting faces of said prisms about said semireflecting film to cause wave front shearing being provided by having said prisms angularly displaced relative to each other about an axis perpendicular to and centered on said adjacent common faces so that the vertex lines of said second dihedral angles intersect and enclose a small angle.

9. An interferometer as set forth in claim 8, wherein $\theta$ is less than $25\frac{5}{7}°$ but greater than $\frac{1}{2}\phi_c$, where $\phi_c$ is the critical angle of the material from which said prisms are formed.

10. An interferometer as set forth in claim 2, wherein said first and third dihedral angles of one of said prisms are each equal to $\theta_1$,
said first and third dihedral angles of said other prism each being equal to $\theta_2$, where $\theta_1$ and $\theta_2$ are each less than 30°,
said second dihedral angles of said one and other prism being equal to $3\theta_1$, and $3\theta_2$, respectively.
said inclination of said reflecting faces of said prisms about said semireflecting film to cause wave front shearing being provided by having said angles $\theta_1$ and $\theta_2$ slightly different from each other.

11. An interferometer as set forth in claim 10, wherein each of $\theta_1$ and $\theta_2$ is less than $25\frac{5}{7}°$, but greater than $\frac{1}{2}\phi_c$, where $\phi_c$ is the critical angle of the material from which the prisms are formed.

References Cited by the Examiner

Strong Concepts of Classical Optics, published by W. H. Freeman and Company, San Francisco, 1958, pages 393–399 relied on.

JEWELL H. PEDERSEN, *Primary Examiner.*